United States Patent
Tanabe et al.

[11] 3,914,024
[45] Oct. 21, 1975

[54] PHOTOGRAPHIC OBJECTIVE HAVING A POLYESTER BASE COLOR TEMPERATURE CONVERSION FILTER

[75] Inventors: Akira Tanabe, Yokohama; Akira Tajima; Naoto Kawamura, both of Kawasaki, all of Japan

[73] Assignee: Canon Kabushiki Kaisha, Tokyo, Japan

[22] Filed: Mar. 20, 1974

[21] Appl. No.: 453,047

[30] Foreign Application Priority Data
Mar. 23, 1973 Japan................................ 48-35303
Mar. 29, 1973 Japan................................ 48-38144

[52] U.S. Cl. ................. 350/196; 350/311; 350/315
[51] Int. Cl.² ........................................... G02B 5/22
[58] Field of Search .......................... 350/315–317, 350/196, 164–166, 311; 252/300; 117/33.3

[56] References Cited
UNITED STATES PATENTS

| | | | |
|---|---|---|---|
| 2,207,656 | 7/1940 | Cartwright et al................. | 350/164 |
| 2,289,133 | 7/1942 | Lessler et al....................... | 350/315 |
| 2,629,285 | 2/1953 | Baker.................................. | 350/196 |
| 3,382,183 | 5/1968 | Donoian et al. ................... | 252/300 |
| 3,504,959 | 4/1970 | Hennessy........................... | 350/316 |

*Primary Examiner*—Ronald J. Stern
*Attorney, Agent, or Firm*—Toren, McGeady, and Stanger

[57] ABSTRACT

The present invention relates to a conversion filter for color temperature to be properly disposed in the light path in the neighborhood of the iris surface inside of the photographing optics, such as a zoom lens, which is to be connected to the camera body. The filter comprises a polyester sheet fixed on a filter frame. The polyester sheet is colored, for example, by means of dyeing, in such manner that a wave length selecting characteristics are given to the sheet. Light having certain predetermined wave length is absorbed by the filter.

12 Claims, 6 Drawing Figures

PHOTOGRAPHIC OBJECTIVE HAVING A POLYESTER BASE COLOR TEMPERATURE CONVERSION FILTER

BACKGROUND

The present invention relates to a conversion filter for color temperature presenting wave length selecting characteristics capable of color temperature compensation in accordance with the photographing conditions.

In accordance with the variation of the photographing conditions such as the kind of the photographing light (namely, sunlight, tungsten light, the photosensitive characteristics of photosensitive materials and so on) various kinds of conversion filters for color temperature are mounted to the photographing optics. The filters to be attached in front of the photographing optics are generally made of a colored optical glass. It is, however, not desirable that the filter to be inserted in the photographing optics be made of optical glass. The reason is that such filters generally present several millimeter of thickness so that by inserting the filters the length of the light path is altered in such a manner that the focus plane is displaced. Thus, some means for compensating the above mentioned alteration of the length of the light path becomes necessary when a filter is put in the photographing optics. In practice, for example, for a zoom lens of a motion picture camera, a very thin filter is placed at a position at which an almost parallel beam is obtained in such a manner that in practice the above mentioned alteration can be disregarded. Further, from the viewpoint of mechanism of the photographing optics, it is required that such filters should be thin.

Until now for photographing optics equipped with a conversion filter for color temperature designed to be put into and out of the photographing optics, as in the case of a zoom lens for motion picture camera, filters with the base in acetate are usually applied because of its easiness in coloring and forming of the thin sheet. However the aberration of the optics itself is disturbed when a filter consisting of acetate sheet fixed on a filter frame is used in the optics. This disadvantage arises from the defective properties of acetate itself. Namely, it is hard to obtain a thin homogeneous sheet with even thickness in acetate. Namely, on the whole surface of an acetate sheet, the index of refraction is not equal.

Further, the acetate sheet is not strong against tension and is short of elasticity so that it is impossible to fix the sheet on the filter frame in a homogeneous state under considerable tension in such a manner that microscopically the thin acetate sheet of filter presents wavings. Besides, due to the above mentioned defective properties, the acetate in the form of thin sheet can not absorb the distortion due to the deformation of filter frame on which the acetate in the form of thin sheet is fixed so that local unbalance in tension often takes place. From the above mentioned reason, a filter with the base in a thin acetate sheet cannot present a homogeneous permeability on the whole surface and, therefore when this filter is disposed in the light path of photographing optics, the aberration of the photographing optics itself is disturbed in such a manner that the image forming ability is necessarily reduced.

Further, the absorption of humidity of the sheet of acetate is high so that due to variation of humidity, the state in which the sheet is attached on the filter frame is changed in such a manner that the above mentioned disturbance of the aberration is also varied. Accordingly, the image forming ability of the photographing optics in which such filter is disposed becomes unstable.

SUMMARY

One object of the present invention is to offer a new conversion filter for color temperature which does not cause disturbance in the aberration of the photographing optics.

Another object of the present invention is to offer a new conversion filter for color temperature which does not detrimentally affecting the quality of the image formed by the photographing optics.

Further, another object of the present invention is to offer a new conversion filter for color temperature suited to be disposed of the light path in the photographing optics.

The conversion filter for color temperature according to the present invention consists of a polyester sheet presenting wave length selecting characteristics and fixed on a filter frame. The polyester sheet is preferably colored by means of dyeing and given wave length selecting characteristics in such a manner that in accordance with the color dyed a certain predetermined quantity of the light with certain predetermined wave length is absorbed so as to compensate the color temperature.

It is easy to form polyester with a homogeneous structure. Polyester is superior to acetate in the fact that it is free of irregular distribution of the index of refraction due to the irregular structure of the material. Further, polyester is more easily formed into a sheet with even thickness and smooth surface than acetate. Further, polyester is more elastic and durable than acetate, in that the former can withstand three times as much tension as the latter. Therefore a filter consisting of a polyester sheet having even thickness evenly fixed on the filter frame presents even and uniform permeability over the whole surface. Therefore the aberration of the photographing optics is hardly disturbed, while the image forming ability is hardly reduced when a filter having a polyester sheet base is disposed in the light path of the photographing optics.

On the other hand, the polyester sheet of the filter generally presents a high index of reflection as compared with the lens with permeability improving process. This leads to the formation of ghost and flare on the image plane. However, the above mentioned formation of ghost and flare can be eliminated preferably by coating one or both surfaces of the polyester sheet of the filter with a reflection prohibiting film or the like.

DETAILED DESCRIPTION

Figure 1:
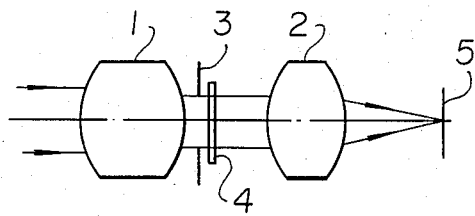
FIG. 1 shows a photographing optics in the light path of which a conversion filter for color temperature is disposed.

In FIG. 1, an objective lens is composed of lens systems 1 and 2 and is supported on a lens mount (not shown in the drawings). The lens system 1 of the objective lens makes the light flux from a scene object to be afocal. The image of the scene object is formed on the image forming plane, at which a photosensitive film 5 is placed. A diaphragm 3 is placed in the light path between the lens systems 1 and 2 where the beam is almost parallel to adjust the light quantity. In the photographing optical system, the diaphragm 3 forms the pupil plane of the system.

Photosensitive film for a still-camera and a cine-camera has, in general, spectral sensitivity characteristics with respect to the light emitted from a tungsten lamp. Accordingly, when photographing a scene object under the sun light with such a film, a conversion filter for color temperature is used to absorb light of short wave length, such as ultraviolet and should be disposed in the optical path of the objective lens, that is, a conversion filter for color temperature should be disposed in the optical path corresponding to a light source for illuminating a scene object and spectral sensitivity of film.

In FIG. 1, a filter 4, having a polyester sheet dyed with a dyestuff for centrally absorbing the light in the vicinity of ultraviolet, is disposed to be adjacent to the rear of the diaphragm 3 which forms the pupil plane. In FIG. 1, the filter 4 is disposed in the light path of the objective lens. The filter 4 can be inserted and removed from the space close to the pupil plane of the photographing optical system by external operation.

Figure 2:
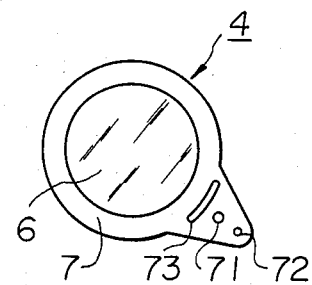
FIG. 2 shows a plan view of an embodiment of the conversion filter for color temperature according to the present invention.

In FIG. 2, a conversion filter for color temperature 4 is made by putting a polyester sheet on the filter frame 7. According to an embodiment of the present invention, the polyester sheet 6 is about 25 $\mu$ in thickness and is painted with coloring matter which absorbs centrally the light in the vicinity of ultraviolet corresponding to the spectral sensitivity of the film 5. The coloring matter, which effectively absorbs the light in the vicinity of ultraviolet, are those belonging to a red color system and a yellow color system. The polyester sheet painted with the mixture of the above-mentioned coloring matters belonging to said two kinds of color systems is extremely effective for converting color temperature.

A method for painting polyester includes a coating process, i.e., a melt coating process for fusing coloring matter and polyester together. In the present invention, however, polyester sheet is painted by a dyeing process because of the fact that the polyester sheet 6 is to be functional as a conversion filter for color temperature which is provided in a photographing optical system. Accordingly, not only is the polyester merely to be painted but is to be painted while maintaining the flatness on the surface without causing surface roughness. In addition, the polyester is to be precisely painted so that color shading is kept to a minimum. The flatness of the polyester sheet has to be adjusted by the order of the wave length. In order to paint the polyester sheet 6 precisely keeping the flatness thereon, the dyeing process should be an optimized process. While it has generally been considered to be very difficult to paint polyester sheet of molecules having high density with dyestuff of large-sized molecules, it is rather easy to dye polyester with dyestuffs of fine molecules corresponding to the foregoing density.

As an example, a suitable filter can be obtained by means of dyeing a polyester sheet, the filter thus obtained is adapted to absorb centrally the light in the vicinity of ultraviolet and is fully functional to be applicable as a constituent member of a photographing optical system. A useful kind of a dyestuff is that which is provided by mixing red color system dyestuff and yellow color system dyestuff. As for red color system dyestuff, the dyestuff having the color index of C. I. DISPERSE RED 73 (for instance, with the trademark "KAYALON-POLYESTER-RUBINE-GL-SE" produced and sold by NIPPON KAYAKU K. K. and put on the market) is used, and as for yellow color system dyestuff, the dyestuff having the color index of C. I. DISPERSE YELLOW 7 (for instance, with the trademark "DIANIX-YELLOW-5R-E," produced and sold by MITSUBISHI KASEI K. K. and put on the market) is used. A solution of dyes as mentioned above in suspension is kept at a constant temperature between 97° - 98°C, in solution of which a polyester sheet with, for example, 25$\mu$ thickness is immersed for 6 - 7 minutes in such a manner that a colored polyester sheet presenting a sufficient wave length selecting characteristics can be obtained, whereby dyes are distributed evenly in the sheet.

The polyester sheet is fixed on the filter frame 7 evenly without relaxation. The filter frame 7 presents an opening for filter shaft 71, an opening for filter operating bar 72 and an opening for filter stopping pin 73. As is shown also in FIG. 1, the conversion filter for color temperature 4 according to the present invention is usually disposed in the light path of the photographing optics, preferably in a space close to the pupil plane so as to be put in and out by means of an external operation. For example, the filter 4 is disposed as follows. The filter 4 is carried by the filter shaft (not shown in the drawing) mounted on the lens barrel (not shown in the drawing) so as to rotate freely by means of the opening for the filter shaft 71. In the above mentioned opening for filter operating bar 72, the filter operating bar (not shown in the drawing) engages in such a manner that the filter 4 is put into and out of the above mentioned predetermined position in the photographing optics by moving the above mentioned operating bar forward and backward. The insertion and removal of the filter 4 is stopped when the filter stopping pin (not shown in the drawing) mounted on the lens barrel touches the end of the above mentioned opening for filter stopping pin 73. Although the filter 4 may be disposed at any position in the light path in the photographing optics, it is desirable that, as mentioned above, the filter is disposed so as to be inserted and removed from the light path in a space close to the pupil plane in order to avoid the color disturbance of the image resulting from a possible color disturbance in the polyester sheet 6 of the filter or the variation of the length of the light path.

When, in accordance with particular photographing conditions, the filter 4 according to the present invention is properly disposed in the light path of the photographing optics, a certain predetermined quantity of light with a certain determined wave length can be absorbed and the color temperature is compensated in accordance with the wave length selecting characteristics of the polyester sheet 6 (hereby, in case of the dyed polyester sheet, the wave length selecting characteristics is determined by the characteristics of the dye, the density of the dye distributed in polyester and so on).

Figure 3:
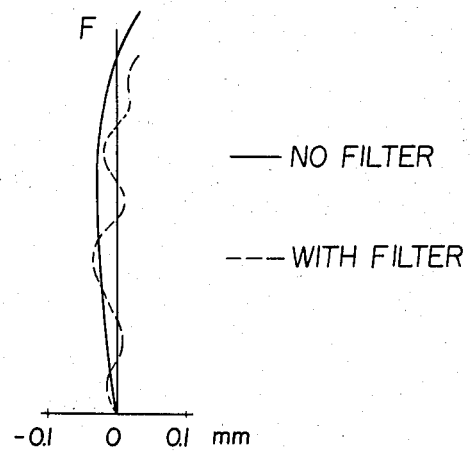
FIG. 3 shows a diagram of the aberration to explain the spherical aberration of the photographing optics in the light path of which a filter with a polyester sheet base is disposed.
Figure 4:
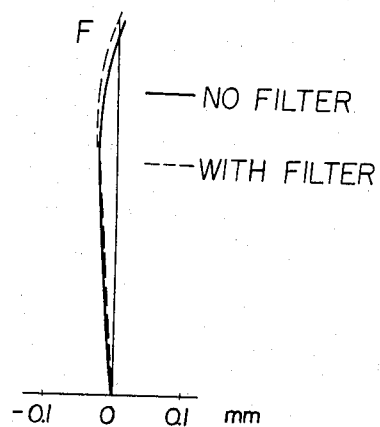
FIG. 4 shows a diagram of the aberration to explain the spherical aberration of the photographing optics in the light path of which an embodiment of the filter according to the present invention is disposed.

In FIG. 3 the disturbance of the spherical aberration in the above mentioned photographing optics is shown in broken lines when the conversion filter for color temperature with the base of acetate sheet is disposed in the light path in the photographing optics (for example, at the same position as the filter 4 in FIG. 1). The spherical aberration is disturbed at random over the whole F value, and the disturbance is so large that it cannot be neglected. Further it has been confirmed that the wave front aberration is as large as 0.6 – several $\mu$ when a filter with the base of acetate sheet is used. Accordingly, the image forming efficiency of the photographing optics in which such a filter is disposed is largely reduced. Further, due to the random aberration, the image forming efficiency cannot be improved no matter how small the diaphragm is closed. On the other hand, the spherical aberration when the conversion filter for color temperature according to the present invention is disposed in the light path of the photographing optics is, as shown in FIG. 4, not so much disturbed as when the conversion filter is not disposed. The wave front aberration is also as small as 0.15 – 0.3$\mu$ even when the above mentioned filter 4 is inserted. Accordingly, it can be said that the image forming efficiency when the above mentioned filter is disposed is hardly reduced.

Figure 5:
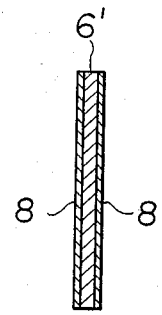
FIG. 5 shows a cross section through an embodiment of the filter according to the present invention on both surfaces of which reflection prohibiting films are coated.
Figure 6:
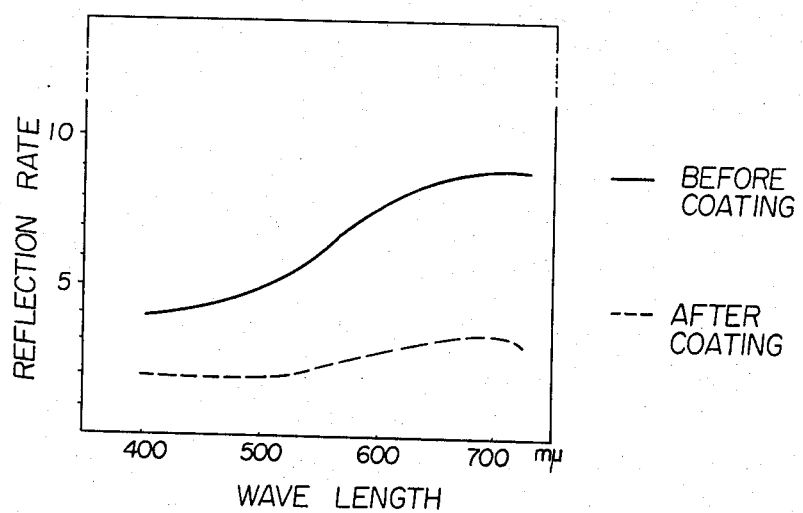
FIG. 6 shows a diagram to explain the index of reflection of the filter with base in polyester sheet on both surfaces of which reflection prohibiting films are coated.

On the other hand, the lenses to be used in the photographing optics generally undergo a permeability improving process in such a manner that the ghost and the flare on the image forming plane are eliminated. On the other hand, the reflection ratio of polyester which is only dyed is high as compared with the above mentioned lenses. Therefore the ghost and the flare takes place on the image forming plane due to the reflection of the light from the surface of the filter 4 when a filter 4 which did not undergo the permeability improving process is disposed in the light path of the photographing optics. Therefore it is desirable that the thin polyester sheet 6 of the above mentioned filter 4 should undergo a permeability improving process. The thin polyester sheet 6' shown in FIG. 5 presents on both surfaces a reflection prohibiting coating 8 with, for example, 125m$\mu$ thickness consisting of a thin layer of, for example, magnesium fluoride. Although, generally speaking, the thin sheet of synthetic resin which is processed with an ordinary coating has difficulties as to heat resistance and color fading, the difficulties can be avoided by means of the so called soft coating which is carried out under the low temperature. As is shown in FIG. 6, the light reflection ratio of the thin polyester sheet 6 being coated with the above mentioned reflection prohibiting layer is one third to one half as low as that of the thin polyester sheet 6 without the permeability improving process. Therefore, the aberration of the photographing optics is hardly disturbed while the ghost and the flare due to the light reflected from the above mentioned filter 4 is almost eliminated. This is done in such a manner that the quality of the image is improved when the conversion filter for color temperature 4 with the base of the thin polyester sheet 6 with permeability improving process is used.

What is claimed is:

1. A photographing optical system for providing an image to a photosensitive material at an image plane, comprising:
   an objective lens;
   a diaphragm disposed in the optical path of said objective lens and forming a pupil plane of the photographing optical system;
   a filter composed of a filter frame and a polyester sheet mounted on said frame, said polyester sheet having an absorbed dyestuff for centrally filtering light in the vicinity of ultraviolet, said dyed polyester sheet for converting color temperature of light transmitted by said objective lens to correspond to the spectral sensitivity of said photosensitive material at the image plane of the objective lens; and
   a filter supporting means for supporting said filter and for allowing said filter to be movable into and out of the optical path of the objective lens in accordance with the need to conform the color temperature of scene illumination to said photosensitive material.

2. A photographing optical system as in claim 1 wherein the polyester sheet of said filter includes a surface having a vapor-deposited antireflection coating.

3. A photographing optical system as in claim 1 wherein the polyester sheet of said filter has vapor-deposited antireflection coatings on both surfaces.

4. A photographing optical system for providing an image to a photosensitive material at an image plane, comprising:
   an objective lens;
   a diaphragm disposed in the optical path of said objective lens and forming a pupil plane of the photographing optical system;
   a filter composed of a filter frame and a polyester sheet mounted on said frame, said polyester sheet having an absorbed mixed dyestuff, said dyestuff being a mixture of a red color system dyestuff and a yellow color system dyestuff, said mixed dyestuff being adapted to centrally filter light in the vicinity of ultraviolet, said dyed polyester sheet for converting color temperature of light transmitted by said objective lens to correspond to the spectral sensitivity of said photosensitive material at the image plane of the objective lens; and
   a filter supporting means for supporting said filter and for allowing said filter to be movable into and out of the optical path of the objective lens in accordance with the need to conform the color temperature of scene illumination to said photosensitive material.

5. A photographing optical system as in claim 4 wherein the polyester sheet of said filter includes a surface having a vapor-deposited antireflection coating.

6. A photographing optical system as in claim 4 wherein the polyester sheet of said filter has been vapor-deposited antireflection coatings on both surfaces.

7. A photographing optical system for providing an image to a photosensitive material at an image plane, comprising:

an objective lens, said lens having a first surface and a last surface, said lens directing the light from a scene object to be afocal at least at one point in the optical path between the first surface of the lens and the last surface of the lens;

a diaphragm disposed in the optical path of said objective lens wherein said light is subject to being afocal, said diaphragm for forming a pupil plane of the photographic optical system;

a filter composed of a filter frame and a polyester sheet mounted on said frame, said polyester sheet having an absorbed dyestuff for centrally filtering light in the vicinity of ultraviolet, said dyed polyester sheet for converting color temperature of light transmitted by said objective lens to correspond to the spectral sensitivity of said photosensitive material at the image plane of the objective lens; and a filter supporting means disposed in the optical path of said objective lens where said light is subject to be afocal and adjacent to said diaphragm, for supporting said filter and for allowing said filter to be movable into and out of the optical path of the objective lens in accordance with the need to conform the color temperature of scene illumination to said photosensitive material.

8. A photographing optical system as in claim 7 wherein the polyester sheet of said filter includes a surface having a vapor-deposited antireflection coating.

9. A photographing optical system as in claim 7 wherein the polyester sheet of said filter has a vapor-deposited antireflection coatings on both surfaces.

10. A photographing optical system for providing an image to a photosensitive material at an image plane, comprising:

an objective lens, said lens having a first surface and a last surface, said lens for directing the light from a scene object to be afocal at least at one point in the optical path between the first surface of the lens and the last surface of the lens;

a diaphragm disposed in the optical path of said light and subject to being afocal, said diaphragm for forming a pupil plane of the photographic optical system; a filter composed of a frame and a polyester sheet mounted on said frame, said polyester sheet having an absorbed mixed dyestuff, said dyestuff being a mixture of a red color system dyestuff and a yellow color system dyestuff, said mixed dyestuff being adapted to centrally filter light in the vicinity of ultraviolet, said dyed polyester sheet for converting color temperature of light transmitted by said objective lens to correspond to the spectral sensitivity of said photosensitive material at the image plane of the objective lens; and a filter supporting means disposed in the optical path of said objective lens where said light is subject to be afocal and adjacent to said diaphragm, for supporting said filter and for allowing said filter to be removably inserted into and out of the optical path of the objective lens in accordance with the need to conform the color temperature of scene illumination to said photo sensitive material.

11. A photographing optical system as in claim 10 wherein the polyester sheet of said filter includes a surface having a vapor-deposited antireflection coating.

12. A photographing optical system as in claim 10 wherein the polyester sheet of said filter has vapor-deposited antireflection coatings on both surfaces.

* * * * *